United States Patent
Masuyama et al.

(10) Patent No.: US 10,852,881 B2
(45) Date of Patent: Dec. 1, 2020

(54) ELECTRONIC APPARATUS, CONTROL METHOD OF ELECTRONIC APPARATUS, AND NON-TRANSITORY COMPUTER READABLE MEDIUM

(71) Applicant: CANON KABUSHIKI KAISHA, Tokyo (JP)

(72) Inventors: Kimihiro Masuyama, Kamakura (JP); Jun Kamiya, Kawasaki (JP); Takuma Iwagami, Yokohama (JP); Hirokazu Izuoka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/453,781

(22) Filed: Jun. 26, 2019

(65) Prior Publication Data

US 2020/0004373 A1    Jan. 2, 2020

(30) Foreign Application Priority Data

Jun. 29, 2018  (JP) ................................. 2018-125352

(51) Int. Cl.
*G06F 3/041* (2006.01)
*H04N 5/232* (2006.01)

(52) U.S. Cl.
CPC .......... *G06F 3/0416* (2013.01); *G06F 3/0412* (2013.01); *H04N 5/23216* (2013.01)

(58) Field of Classification Search
CPC ........... G09G 3/36; G06F 3/041; G06F 3/045; G01R 27/26; G06K 11/06; G08C 21/00
See application file for complete search history.

(56) References Cited

U.S. PATENT DOCUMENTS

| | | | | |
|---|---|---|---|---|
| 2010/0283750 A1* | 11/2010 | Kang | ..................... | G06F 3/0416 345/173 |
| 2011/0157078 A1* | 6/2011 | Miyazawa | .............. | G06F 3/044 345/174 |
| 2013/0070970 A1* | 3/2013 | Yamane | ............... | G02B 21/367 382/107 |
| 2014/0306907 A1* | 10/2014 | Hoshino | ............... | G06F 3/0304 345/173 |
| 2020/0034026 A1* | 1/2020 | Han | ...................... | G06F 3/0484 |

FOREIGN PATENT DOCUMENTS

JP    2018-036802 A    3/2018

* cited by examiner

*Primary Examiner* — Pegeman Karimi
(74) *Attorney, Agent, or Firm* — Cowan, Liebowitz & Latman, P.C.

(57) ABSTRACT

An electronic apparatus includes: a touch detector; and a control unit: (1) to execute a first function in response to movement by a predetermined distance in a first direction and to update the reference position when a detected touch position has moved in the first direction, (2) to execute a second function in response to movement by the predetermined distance in a second direction and to update the reference position when the detected touch position has moved in the second direction and the detected touch position after the movement is in the first region, and (3) not to execute the second function and not to update the reference position even if a movement distance reaches the predetermined distance when the detected touch position has moved in the second direction and the detected touch position after the movement is in the second region.

21 Claims, 5 Drawing Sheets

ELECTRONIC APPARATUS, CONTROL METHOD OF ELECTRONIC APPARATUS, AND NON-TRANSITORY COMPUTER READABLE MEDIUM

BACKGROUND OF THE INVENTION

Field of the Invention

The present invention relates to an electronic apparatus, a control method of an electronic apparatus, and a non-transitory computer readable medium.

Description of the Related Art

In recent years, electronic apparatuses (for example, digital cameras) including an operating unit such as a touch panel or a touch pad are increasing rapidly. Due to this, a direct operation is enabled due to the coincidence between an input target and an operation target and users can perform operations more easily. Here, these operating units may execute a specific function that a user has not intended, for example, when the user touches the operating unit.

In contrast, Japanese Patent Application Laid-Open No. 2018-36802 discloses a technique of dividing a touch panel into three regions including an effective region, a buffer region, and an ineffective region so that a user operation is allowed on regions other than the ineffective region.

SUMMARY OF THE INVENTION

When a slide operation of moving a touch position while maintaining a touch on an operating member that detects a touch is performed on the operating member, a slide function of increasing and decreasing a setting parameter whenever a predetermined distance is moved by one slide operation may be executed. In such an operation, the parameter can be changed slightly if a short distance is moved by one slide operation whereas the parameter can be changed greatly if a long distance is moved by one slide operation. In this case, a user adjusts the slide movement distance closely in order to set the parameter to a desired value. Therefore, it is required that the user feels such an operational feeling that a touching finger or pen has to be moved for an approximately always-the-same distance in order to achieve one level of parameter change. In other words, it is required that the user feels such an operational feeling (linearity) that a moving distance of a finger or a pen and a parameter change amount are proportional to each other. However, the attitude or the like of a touching finger becomes unnatural in regions of a touch detection surface where it is difficult to touch. Even when a slide function is executed in proportion to a change amount of a position coordinate output on the basis of a detected touch operation, the user may not feel the linearity proportional to the moving operation of a finger or a pen.

Therefore, an object of the present invention is to provide a technique of improving the operability of a slide operation of touching and moving a touch position.

The present invention in its first aspect provides an electronic apparatus includes: a touch detector configured to detect a touch operation on a touch detection surface; and at least one memory and at least one processor which function as: a control unit configured: in a case where a direction from a first region of the touch detection surface toward a second region adjacent to the first region is denoted by a second direction and a direction opposite to the second direction is denoted by a first direction, (1) to execute a first function in response to movement of a detected touch position by a predetermined distance in the first direction from a reference position of movement determination of a touch and to update the reference position to a position moved for the predetermined distance in the first direction in a case where the detected touch position has moved in the first direction from the reference position, (2) to execute a second function in response to movement of a detected touch position by the predetermined distance in the second direction from the reference position and to update the reference position to a position moved for the predetermined distance in the second direction in a case where the detected touch position has moved in the second direction from the reference position and the detected touch position after the movement is in the first region, and (3) not to execute the second function and not to update the reference position even if a movement distance from the reference position to a detected touch position after the movement reaches the predetermined distance in a case where the detected touch position has moved in the second direction from the reference position and the detected touch position after the movement is in the second region.

According to the present invention, it is possible to provide a technique of improving the operability of a slide operation of touching and moving a touch position.

Further features of the present invention will become apparent from the following description of exemplary embodiments with reference to the attached drawings.

DESCRIPTION OF THE EMBODIMENTS

First Embodiment

<External View of Digital Camera 100>

Figure 1A:
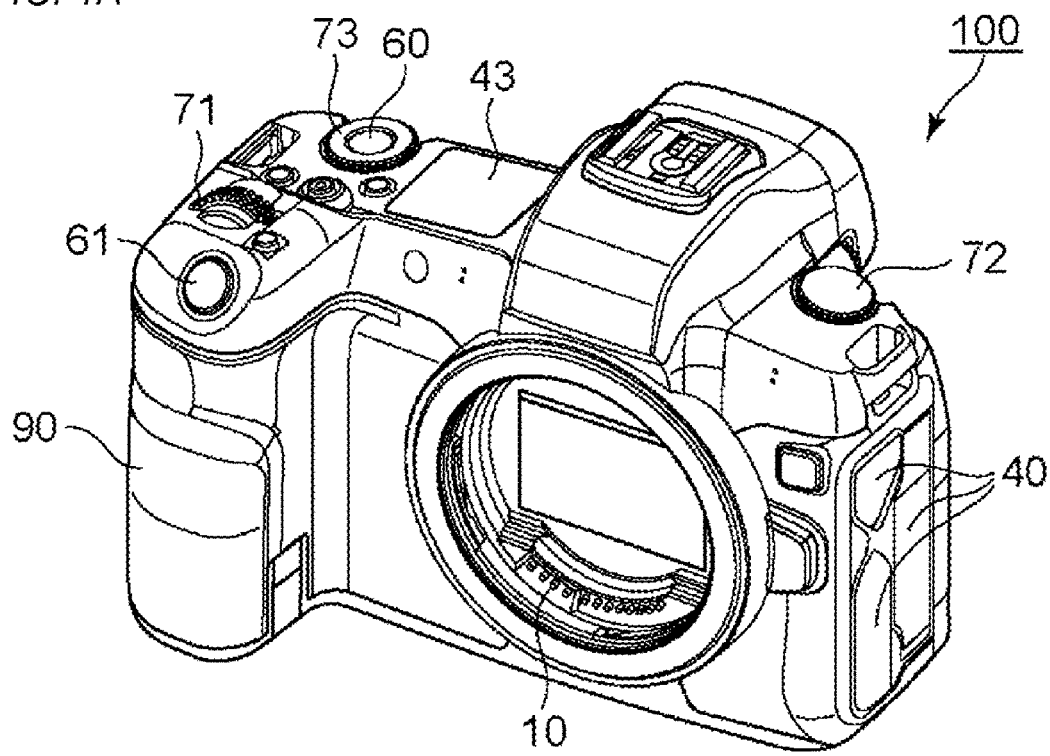
FIGS. 1A and 1B are external views of a digital camera 100.
Figure 1B:
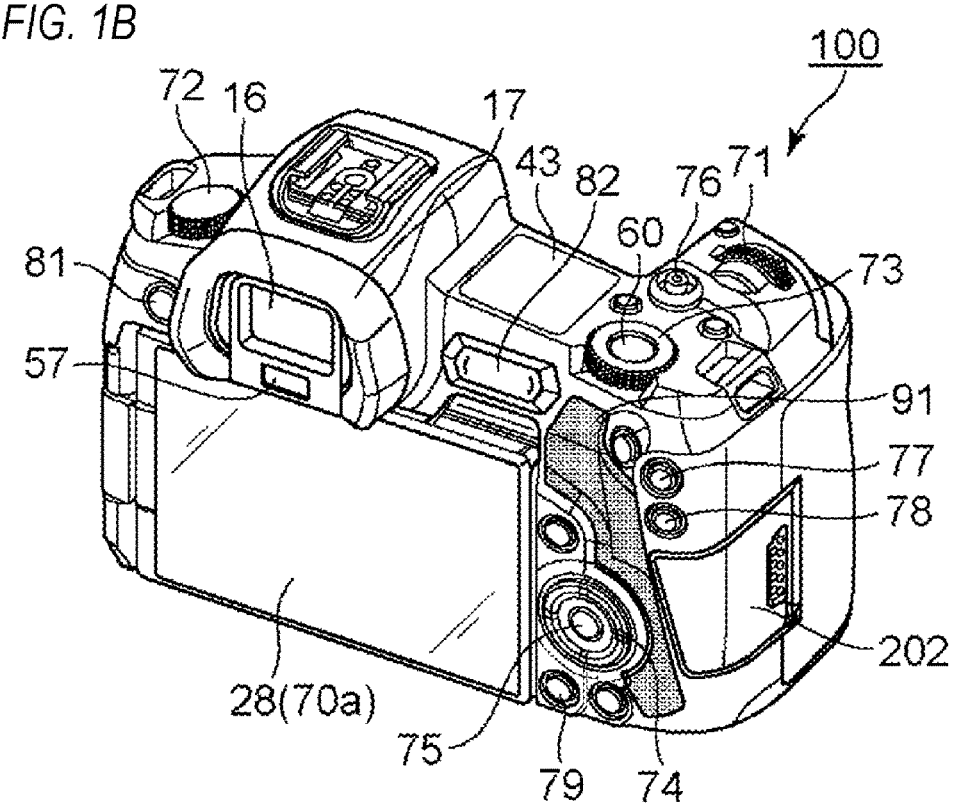

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. A touch panel 70*a* is capable of detecting a touch operation performed on a display surface (a touch operation surface) of the display unit 28. A finder outer display unit 43 is a display unit provided on an upper surface of the digital camera 100 for displaying various setting values of the digital camera 100 including a shutter speed and an aperture. A shutter button 61 is an operation member for issuing a photography instruction. A mode changeover switch 60 is an operation member for switching between various modes. A terminal cover 40 is a cover for protecting a connector (not shown) to which is connected a connection cable or the like for connecting the digital camera 100 to an external device.

A main electronic dial 71 is a rotating operation member and, by turning the main electronic dial 71, setting values such as a shutter speed and an aperture can be changed. A power switch 72 is an operation member for switching power of the digital camera 100 on and off. A sub electronic dial 73 is a rotating operation member and, by turning the sub electronic dial 73, operations such as moving a selection frame (cursor) and image feeding can be performed. A four-way key 74 is configured such that upper, lower, left, and right portions thereof are respectively depressible, and enables a process corresponding to a depressed portion of the four-way key 74 to be performed. A SET button 75 is a push button mainly used to determine a selected item.

A moving image button 76 is used to issue instructions to start or stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) can be enlarged or reduced. In a playback mode, the enlargement button 78 functions as an operation button for enlarging a playback image or increasing an enlargement rate of the playback image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display unit 28. A menu button 81 is a push button used for performing an instruction operation to display a menu screen and, when the menu button 81 is pushed, a menu screen enabling various settings to be performed is displayed on the display unit 28. A user can intuitively perform various settings using the menu screen displayed on the display unit 28, the four-way key 74, and the SET button 75.

A touch bar 82 (multi-function bar: M-Fn bar) is a linear touch operation member (line touch sensor) capable of accepting a touch operation. The touch bar 82 is arranged at a position where a touch operation can be performed on the touch bar 82 (where the touch bar 82 is touchable) by the thumb of a right hand gripping a grip portion 90 in a normal grip (a grip recommended by a manufacturer). The touch bar 82 is an accepting unit capable of accepting a tap operation (an operation involving touching and then releasing the touch without movement within a prescribed period of time), leftward and rightward slide operations (operations involving touching and then moving a touch position while maintaining the touch), and the like with respect to the touch bar 82. The touch bar 82 is an operation member that differs from the touch panel 70a and is not equipped with a display function.

A communication terminal 10 is a communication terminal used by the digital camera 100 to communicate with a lens unit 150 (to be described later; attachable and detachable). An eyepiece 16 is an eyepiece of an eyepiece finder 17 (a look-in finder), and the user can visually confirm, via the eyepiece 16, an image displayed on an internal EVF 29 (to be described later). An eye proximity detecting unit 57 is an eye proximity detection sensor that detects whether or not the eye of the user (photographer) is approaching the eyepiece 16. A lid 202 is a lid of a slot in which the recording medium 200 (to be described later) is stored. The grip portion 90 is a holding portion configured in a shape readily gripped by the right hand of the user when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip portion 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest portion 91 (a thumb standby position) is a grip member provided at a location where the thumb of the right hand gripping the grip portion 90 can be readily placed on a rear side of the digital camera 100 in a state where none of the operation members are being operated. The thumb rest portion 91 is constituted by a rubber member or the like in order to enhance holding force (grip feeling).

<Configuration Block Diagram of Digital Camera 100>

Figure 2:
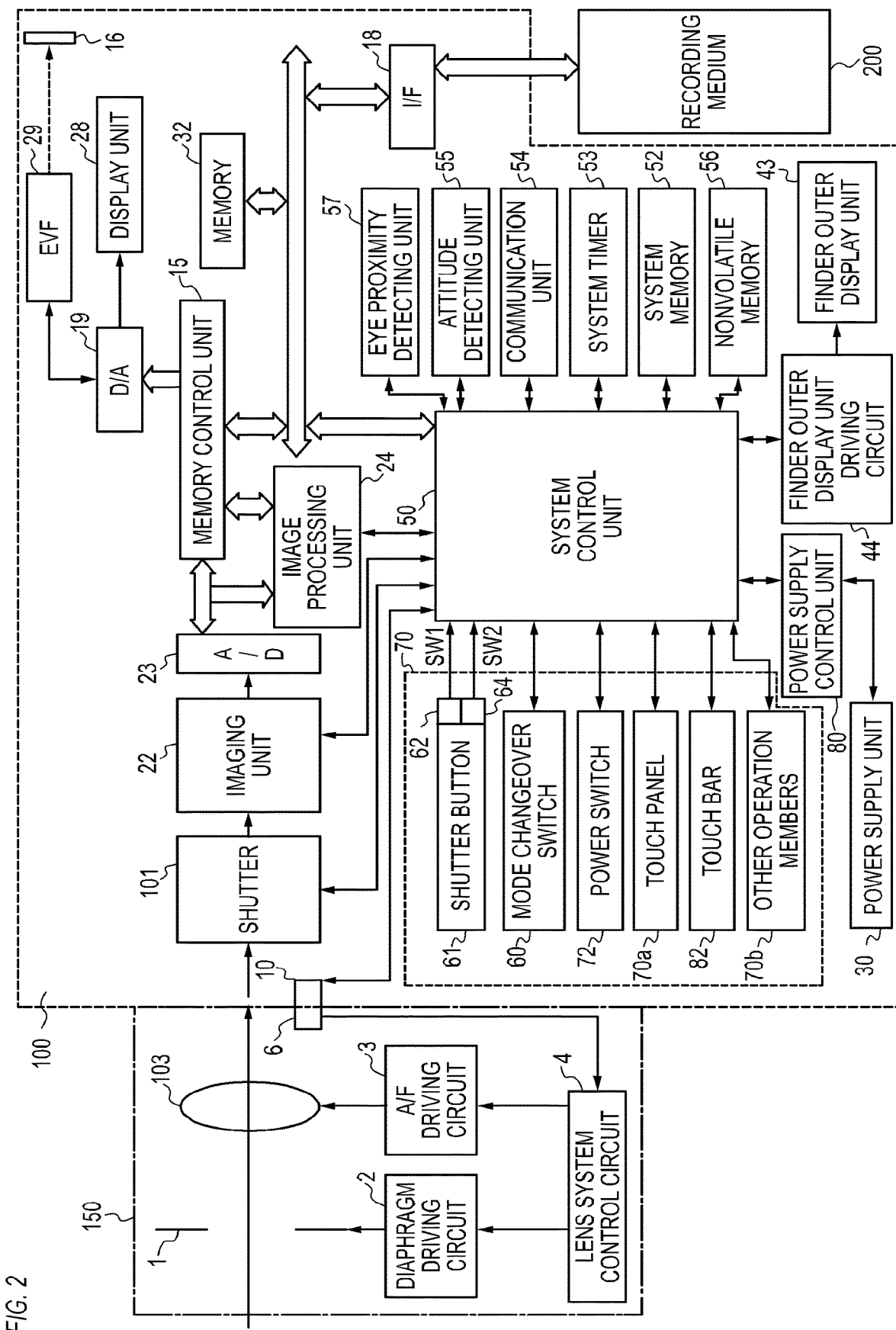
FIG. 2 is a block diagram of the digital camera 100.

FIG. 2 is a block diagram showing a configuration example of a digital camera 100. The lens unit 150 is a lens unit mounted with a replaceable photographing lens. While the lens 103 is usually configured by a plurality of lenses, in FIG. 2, the lens 103 is shown simplified with only one lens. A communication terminal 6 is a communication terminal used by the lens unit 150 to communicate with the digital camera 100, and a communication terminal 10 is a communication terminal used by the digital camera 100 to communicate with the lens unit 150. The lens unit 150 communicates with a system control unit 50 via the communication terminals 6 and 10. In addition, the lens unit 150 controls a diaphragm 1 via a diaphragm driving circuit 2 using an internal lens system control circuit 4. Furthermore, the lens unit 150 performs focusing by displacing a position of the lens 103 via an AF driving circuit 3 using the lens system control circuit 4.

A shutter 101 is a focal plane shutter capable of freely controlling an exposure time of an imaging unit 22 under the control of the system control unit 50.

The imaging unit 22 is an imaging element constituted by a CCD, a CMOS element, or the like which converts an optical image into an electrical signal. The imaging unit 22 may have an imaging surface phase difference sensor that outputs information on a defocusing amount to the system control unit 50. An A/D converter 23 converts an analog signal output from the imaging unit 22 into a digital signal.

An image processing unit 24 performs prescribed processes (pixel interpolation, a resizing process such as reduction, a color conversion process, and the like) on data from the A/D converter 23 or data from a memory control unit 15. In addition, the image processing unit 24 performs a prescribed computing process using image data of a captured image, and the system control unit 50 performs exposure control and ranging control based on a computation result obtained by the image processing unit 24. Accordingly, processes such as an AF (automatic focusing) process, an AE (automatic exposure) process, and an EF (preliminary light emission before flash) process in a TTL (through-the-lens) system are performed. The image processing unit 24 further performs a prescribed computing process using image data of a captured image and performs an AWB (automatic white balance) process in the TTL system based on an obtained computation result.

Output data from the A/D converter 23 is written into a memory 32 via the image processing unit 24 and the memory control unit 15. Alternatively, output data from the A/D converter 23 is written into the memory 32 via the memory control unit 15 without involving the image processing unit 24. The memory 32 stores image data obtained by the imaging unit 22 and converted into digital data by the A/D converter 23 and image data to be displayed on the display unit 28 and the EVF 29. The memory 32 has sufficient storage capacity for storing a prescribed number of still images, a prescribed time's worth of moving images, and audio.

In addition, the memory 32 also doubles as a memory (video memory) for image display. A D/A converter 19 converts data for image display stored in the memory 32 into an analog signal and supplies the analog signal to the display unit 28 and the EVF 29. In this manner, image data for display having been written into the memory 32 is displayed by the display unit 28 and the EVF 29 via the D/A converter 19. The display unit 28 and the EVF 29 each perform display in accordance with the analog signal from the D/A converter 19 on a display such as an LCD, an organic EL, or the like. A live view display (LV) can be performed by converting digital signals subjected to A/D conversion by the A/D converter 23 and accumulated in the memory 32 into analog signals with the D/A converter 19, and sequentially transmitting and displaying the analog signals to the display unit 28 or the EVF 29. Hereinafter, an image displayed in a live view display will be referred to as a live view image (LV image).

Various setting values of the camera including a shutter speed and an aperture are displayed on the finder outer display unit 43 via a finder outer display unit driving circuit 44.

A nonvolatile memory 56 is an electrically erasable and recordable memory and is, for example, an EEPROM. Constants, a program, and the like for operations of the system control unit 50 are recorded in the nonvolatile memory 56. In this case, the program refers to a program for executing the various flow charts described later in the present embodiment.

The system control unit 50 is a control unit which is constituted by at least one processor or circuit and which controls the entire digital camera 100. The system control unit 50 realizes the respective processes of the present embodiment (to be described later) by executing a program recorded in the nonvolatile memory 56 described earlier. A system memory 52 is, for example, a RAM, and the system control unit 50 deploys constants and variables for the operations of the system control unit 50, the program read from the nonvolatile memory 56, and the like on the system memory 52. In addition, the system control unit 50 also performs display control by controlling the memory 32, the D/A converter 19, the display unit 28, and the like.

A system timer 53 is a time measuring unit for measuring time used in various control and time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter based on detection results thereof and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communication unit 54 transmits and receives video signals and audio signals to and from an external device connected wirelessly or by a wired cable. The communication unit 54 is also capable of connecting to a wireless LAN (Local Area Network) or the Internet. In addition, the communication unit 54 is also capable of communicating with an external device by Bluetooth (registered trademark) or Bluetooth Low Energy. The communication unit 54 is capable of transmitting images (including LV images) captured by the imaging unit 22 and images recorded on the recording medium 200 and receiving image data and various other types of information from an external device.

An attitude detecting unit 55 detects an attitude of the digital camera 100 relative to a direction of gravitational force. Based on the attitude detected by the attitude detecting unit 55, a determination can be made as to whether an image photographed by the imaging unit 22 is an image photographed while holding the digital camera 100 horizontally or an image photographed while holding the digital camera 100 vertically. The system control unit 50 can add direction information in accordance with the attitude detected by the attitude detecting unit 55 to an image file of the image captured by the imaging unit 22 and record a rotated version of the image. An acceleration sensor, a gyro sensor, or the like can be used as the attitude detecting unit 55. A motion (a pan, a tilt, an uplift, whether stationary or not, and the like) of the digital camera 100 can be detected using the acceleration sensor or the gyro sensor that is the attitude detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display unit 28 and the EVF 29 to display (displayed state) and hide (hidden state) in accordance with the state detected by the eye proximity detecting unit 57. More specifically, at least when a current state is the photography standby state and when a display destination is to be automatically switched, the display unit 28 as the display destination is set to display and the EVF 29 is set to hide when unapproached by the eye. In addition, during an eye approach, the EVF 29 as the display destination is set to display and the display unit 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting portion (not shown) of the eye proximity detecting unit 57 is reflected by the object and received by a light receiving portion (not shown) of the infrared proximity sensor. Based on an amount of received infrared light, how close the object is from the eyepiece 16 (eye proximity distance) can be determined. In this manner, the eye proximity detecting unit 57 performs eye proximity detection in which a distance of approach of an object with respect to the eyepiece 16 is detected. An eye approach is to be detected when an object having approached the eyepiece 16 to within a prescribed distance from an eye-unapproached state (unapproached state) is detected. An eye separation is to be detected when an object of which an approach has been detected recedes to a prescribed distance or more from an eye-approached state (approached state). A threshold for detecting an eye approach and a threshold for detecting an eye separation may differ from each other by, for example, setting a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as an approach by an eye or an object which can be regarded as an eye approach can be detected.

An operating unit 70 is an input unit for accepting an operation (a user operation) by the user and is used to input various operation instructions to the system control unit 50. As shown in FIG. 2, the operating unit 70 includes the mode changeover switch 60, the shutter button 61, the power switch 72, the touch panel 70a, and the touch bar 82. As other operation members 70b, the operating unit 70 also includes the main electronic dial 71, the sub electronic dial 73, the four-way key 74, the SET button 75, the moving image button 76, the AE lock button 77, the enlargement button 78, the playback button 79, and the menu button 81.

The mode changeover switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode changeover switch 60, the user can directly switch to any of these modes. Alternatively, after temporarily switching to a list screen of the photography mode using the mode changeover switch 60, another operation member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of an AF (automatic focusing) process, an AE (automatic exposure) process, an AWB (automatic white balance) process, an EF (preliminary light emission before flash) process, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the imaging unit 22 to writing a captured image into the recording medium 200 as an image file.

The touch panel 70a and the display unit 28 can be integrally configured. For example, the touch panel 70a is configured such that transmittance of light does not obstruct display by the display unit 28 and is mounted to an upper layer of a display surface of the display unit 28. Subsequently, an input coordinate on the touch panel 70a and a display coordinate on the display surface of the display unit 28 are associated with each other. Accordingly, a GUI (graphical user interface) can be provided which enables the user to feel as if a screen displayed on the display unit 28 can be directly manipulated. The system control unit 50 is capable of detecting the following operations to the touch panel 70a or the following states of the touch panel 70a.

A new touch on the touch panel 70a by a finger or a stylus previously not in touch with the touch panel 70a or, in other words, a start of a touch (hereinafter, referred to as a touch-down)

A state where the touch panel 70a is being touched by a finger or a stylus (hereinafter, referred to as a touch-on)

A finger or a stylus moving while in touch with the touch panel 70a (hereinafter, referred to as a touch-move)

A separation (release) from the touch panel 70a by a finger or a stylus previously in touch with the touch panel 70a or, in other words, an end of a touch (hereinafter, referred to as a touch-up)

A state where nothing is touching the touch panel 70a (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger or a stylus touches the touch panel 70a through an internal bus. In addition, based on the notified information, the system control unit 50 determines what kind of operation (touch operation) has been performed on the touch panel 70a. With respect to a touch-move, a movement direction of a finger or a stylus moving on the touch panel 70a can also be determined for each of a vertical component and a horizontal component on the touch panel 70a based on a change in the detected touch position coordinate. When a touch-move of a prescribed distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the surface of the touch panel 70a as though flicking at the touch panel 70a. A determination that a flick has been performed can be made (a determination that a flick has occurred following a slide operation can be made) when a detection of a touch-move of a prescribed distance or more at a prescribed speed or more is followed by a detection of a touch-up. Furthermore, a touch operation involving touching (multi-touching) a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. Any of a system in which a touch is detected when contact is made with the touch panel and a system in which a touch is detected when a finger or a stylus approaches the touch panel may be adopted.

In addition, the system control unit 50 is capable of detecting the following operations to the touch bar 82 or the following states of the touch bar 82.

A new touch on the touch bar 82 by a finger previously not in touch with the touch bar 82 or, in other words, a start of a touch (hereinafter, referred to as a touch-down)

A state where the touch bar 82 is being touched by a finger (hereinafter, referred to as a touch-on)

A finger moving while in touch with the touch bar 82 (hereinafter, referred to as a touch-move)

A separation (release) from the touch bar 82 by a finger previously in touch with the touch bar 82 or, in other words, an end of a touch (hereinafter, referred to as a touch-up)

A state where nothing is touching the touch bar 82 (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger touches the touch bar 82 through an internal bus and, based on the notified information, the system control unit 50 determines what kind of operation (touch operation) has been performed on the touch bar 82. With respect to a touch-move, a movement in a horizontal direction (left-right direction) on the touch bar 82 is detected. When a movement of a touch position by a prescribed distance or more (a movement of a prescribed amount or more) is detected, it is determined that a slide operation has been performed. A determination that a tap operation has been performed is to be made when an operation is performed in which the touch bar 82 is touched by a finger and the touch is released within a prescribed period of time without performing a slide operation. In the present embodiment, the touch bar 82 is assumed to be a capacitance-system touch sensor. Alternatively, touch sensors of other systems including a resistive film system, a surface acoustic wave system, an infrared system, an electromagnetic induction system, an image recognition system, and an optical sensor system may be used as the touch bar 82.

Three touch sensor electrodes are arranged side by side on the left, center, and right in the layer below the operation surface (key top) of the touch bar 82. The system control unit 50 is capable of reading voltage (a voltage output value) of each of the three touch sensor electrodes. In addition, for each of the touch sensor electrodes, the system control unit 50 can detect a voltage variation amount which is a variation amount of voltage from a base voltage (a reference value adjusted or calibrated in accordance with the environment). The system control unit 50 calculates a weighted average of the voltage variation amount (a variation amount of capacitance) detected for each of the touch sensor electrodes and acquires a signal (a touch coordinate) which indicates a touch position in the X axis direction (a transverse direction) in 256 scales of 0 to 255. 0 represents a leftmost (on the side of the finder 17) position and 255 represents a rightmost (on the side of the thumb rest portion 91) position. Moreover, while the example in which the number of electrodes is three has been described, the number of electrodes is not limited to three.

<Processing Content>

In the present embodiment, the process that the system control unit 50 performs according to a tap operation or a slide operation of a touch bar 82 will be described. In the present embodiment, a user has associated a function with a tap operation or a slide operation (on a touch detection surface) of the touch bar 82 by a user. Although the associated function (setting item) is not particularly limited, in the case of the digital camera 100, for example, the associated function includes setting functions for ISO sensitivity, a shutter speed, an aperture value, exposure correction, white balance, focusing and information display, video capturing, felxible AE, autofocus, a volume, and the like. Moreover, a function may not be associated with the tap operation or the slide operation of the touch bar 82.

In the digital camera 100 illustrated in FIGS. 1A and 1B, the touch bar 82 is disposed at such a position as to be operable by the thumb of the right hand grasping the grip portion 90 as described above. Here, the thumb of the right hand cannot easily reach a portion of the touch bar 82 distant from the right hand, and the movement of a finger may be blocked by a finder member and a user cannot easily touch the left end of the touch bar 82 in a normal touch posture. Specifically, for example, when a centroid position of a contact region of a finger is acquired as a touch coordinate, since the movement is blocked as described above, although a user is touching the left end of the touch bar, the touch coordinate acquired by the touch bar 82 does not correspond to the left end. A case in which the touch coordinate acquired by the touch bar 82 is the left end is a case in which the centroid position of the contact region is the left end. Therefore, a case in which the touch coordinate is the left end is a case in which a large part of a contact surface of the finger is actually touching a portion which is not a touch detection surface, exceeding the touch detection surface toward the left side and a very small part of the right end of the contact surface of the finger is the left end of the touch detection surface. However, the thumb of the right hand cannot easily reach the left-end region of the touch bar 82, the movement of the finger may be blocked by the finder member, and a user cannot easily touch the left-end region in a normal touch posture. Here, a normal touch posture is an operation of touching using the belly or a lateral surface of the thumb so that a slide operation is achieved comfortably. Therefore, a case in which the touch coordinate acquired by the touch bar 82 is the left end is a case in which a user touches the left end in a touch posture which is more unnatural than the normal touch posture such as an erectly standing state of the fingertip rather than the normal touch posture in which a user can easily slide the finger. When a slide operation starts in a touch posture different from such a normal posture, the touch posture of the finger returns to the normal posture as the finger slides toward the right side. For example, the posture changes from a posture wherein the fingertip stands erectly to a posture wherein the belly of a finger touches the touch bar. In this case, since a touch area changes, although the user does not intend to move the finger, the centroid position may change greatly and the acquired touch coordinate may move greatly. In contrast, a situation in which although the user intends to move the finger greatly, the acquired touch coordinate does not move greatly may occur. In any case, a difference occurs between a movement distance indented by the user and a movement distance of the acquired coordinate, and in the left-side region, the touch coordinate is not obtained stably with respect to the feeling of the user. When a user performs a slide operation up to the left-end portion with the finger standing erectly from a state of touching the central portion of the touch bar 82 in a normal touch posture, a difference occurs similarly between the movement distance intended by the user and the movement distance of the acquired coordinate. In this manner, in a region near the left-end region of the touch bar 82, there is a possibility that a difference occurs between the slide movement distance intended by the user and the movement distance of the acquired coordinate. There is a high possibility that a discrepancy occurs from the feeling of a movement distance when a slide operation is performed in at least a region ranging from the right-side portion to the center where a user can easily touch in a normal touch posture, excluding the left end of the touch bar 82. Therefore, there is a possibility that a user does not feel such an operational feeling that a touching finger or pen has to be moved for an approximately always-the-same distance in order to achieve one level of parameter change (increase or decrease) with a slide operation. In other words, there is a possibility that the operational feeling (linearity) that a moving distance of a finger or a pen and a parameter change amount are proportional to each other in a region near the left-end region of the touch bar 82 is inhibited. Therefore, in the present embodiment, the system control unit 50 clips the coordinate of the touch position in the left-end region of the touch bar 82 at the boundary between the region and the other region so that the coordinate is not used in movement distance determination for determining whether a slide operation is performed or not.

Figure 3A:
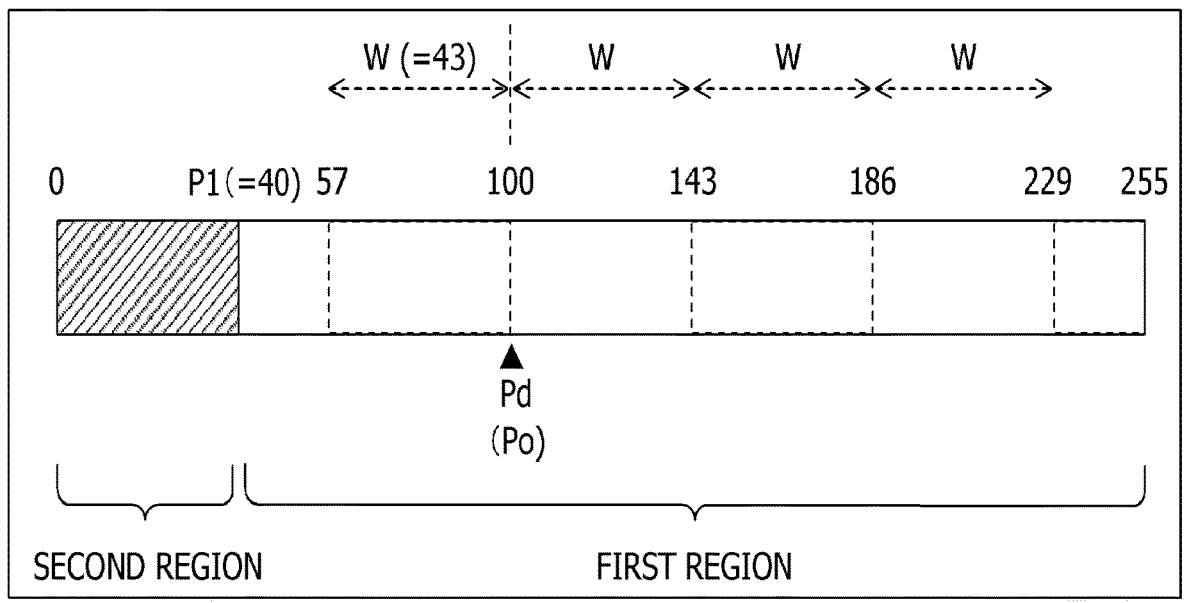
FIGS. 3A and 3B are schematic diagrams illustrating an example of a touch bar according to a first embodiment.
Figure 3B:
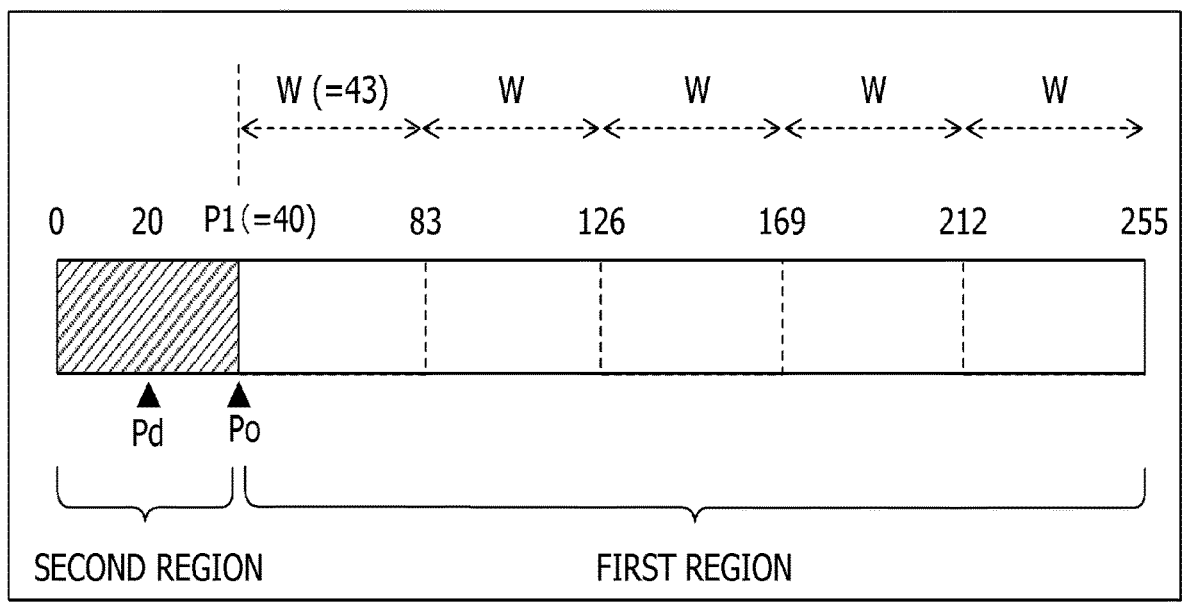

FIGS. 3A and 3B illustrate schematic diagrams of the touch bar 82 according to the present embodiment. In FIGS. 3A and 3B, the coordinate of the touch position with respect to the touch bar 82 is acquired uniquely as 0 to 255, and the left end is the origin. In the present embodiment, a region of the touch bar 82 indicated by a diagonal line in FIGS. 3A and 3B is a region in which a touch coordinate is not obtained stably and is referred to as a second region. Moreover, a region of the touch bar 82 other than (adjacent to) the second region is referred to as a first region. P1 is the coordinate of the left end of the first region and indicates the boundary between the first and second regions. In the present embodiment, an example of P1=40 is described, but there is no limitation thereto. The second region is preferably smaller than the first region. This is to regard the touch position of all touches on the region (the second region) in which a touch coordinate is not obtained stably as P1 and to secure a sufficient region (the first region) to be used for determining the slide movement distance. Pd indicates the detected touch position at which a touch-down which is the starting point of a touch operation on a touch detection surface is detected. FIG. 3A illustrates an example of Pd=100. FIG. 3B illustrates an example of Pd=20. In the present embodiment, although the coordinate of the touch position is illustrated in 256 levels of 0 to 255, the coordinate setting is not particularly limited, and the coordinate may be illustrated in arbitrary levels other than 256 levels and may be normalized to 0 to 1.

In FIGS. 3A and 3B, Po indicates the coordinate of a reference position for determining movement of a slide operation. In the present embodiment, as illustrated in FIG. 3A, when the detected touch position at which a touch-down is detected is within the first region, the coordinate Pd is the coordinate Po of an initial reference position. Moreover, as illustrated in FIG. 3B, when the detected touch position at which a touch-down is detected is within the second region, the coordinate P1 is the coordinate Po of the reference position. This is to clip (fix) the coordinate Po of the reference position to a lower limit P1 (=40) of a region in which the touch coordinate is obtained stably since the touch coordinate is not obtained stably in the second region as described above. In the present embodiment, although the system control unit 50 clips the touch operation in the second region as described above, the touch operation may be regarded as being ineffective.

In the present embodiment, the system control unit 50 executes a slide function when a touch position is moved at a predetermined interval W or more (by a predetermined distance) from the coordinate Po of the reference position while maintaining a touch state. Moreover, the system control unit 50 updates the coordinate Po of the reference position to Po+W (or Po−W) and repeats this process until a touch-up is performed. In the present embodiment, 43 which is a value (length) obtained by (evenly) dividing the distance between 40 (P1) and 255 by 5 is set as the value of W. In this case, the coordinate value of the coordinate Po of the reference position may take any one of four discrete values corresponding to the coordinate Pd of the touch-down position by the updating.

The number of divisions and the value of W are not particularly limited, and the value of W may be 1, for example, and W preferably has a value larger than P1 (the width of the second region). In this way, it is possible to suppress an operation of performing a touch-move of W or more in the second region. Moreover, the width of the first region is preferably equal to or larger than twice the width of W. In this way, since at least one position separated by a predetermined interval W from the coordinate Po of the reference position is secured in the first region, it is possible to perform a slide operation based on a touch-move regardless of the detected touch position of a touch-down.

In the example of FIG. 3A, when the coordinate Pd of the touch-down position is 100, Po is also 100. Moreover, Po is updated when the touch position is moved for a distance of 57 or smaller or 143 or more. Po is updated to 57 (=100−43) when the touch position is moved for a distance of 57 or smaller. Moreover, Po is updated to 143 (=100+43) when the touch position is moved for a distance of 143 or more. That is, the value of Po takes a value in the range of 40 to 255 among values obtained by adding an integer multiple of W to Pd. In FIG. 3A, the detected touch position that Po can take is illustrated by a broken line.

On the other hand, in the example of FIG. 3B, Po is 40 when the coordinate Pd of the touch-down position is 20. Moreover, Po is updated when the touch position is moved for a distance of W or more in the first region. That is, Po is updated when the touch position is moved for a distance of 83 or more. In this case, Po is updated to 83 (=40+43). After that, Po changes similarly to FIG. 3A.

Figure 4:
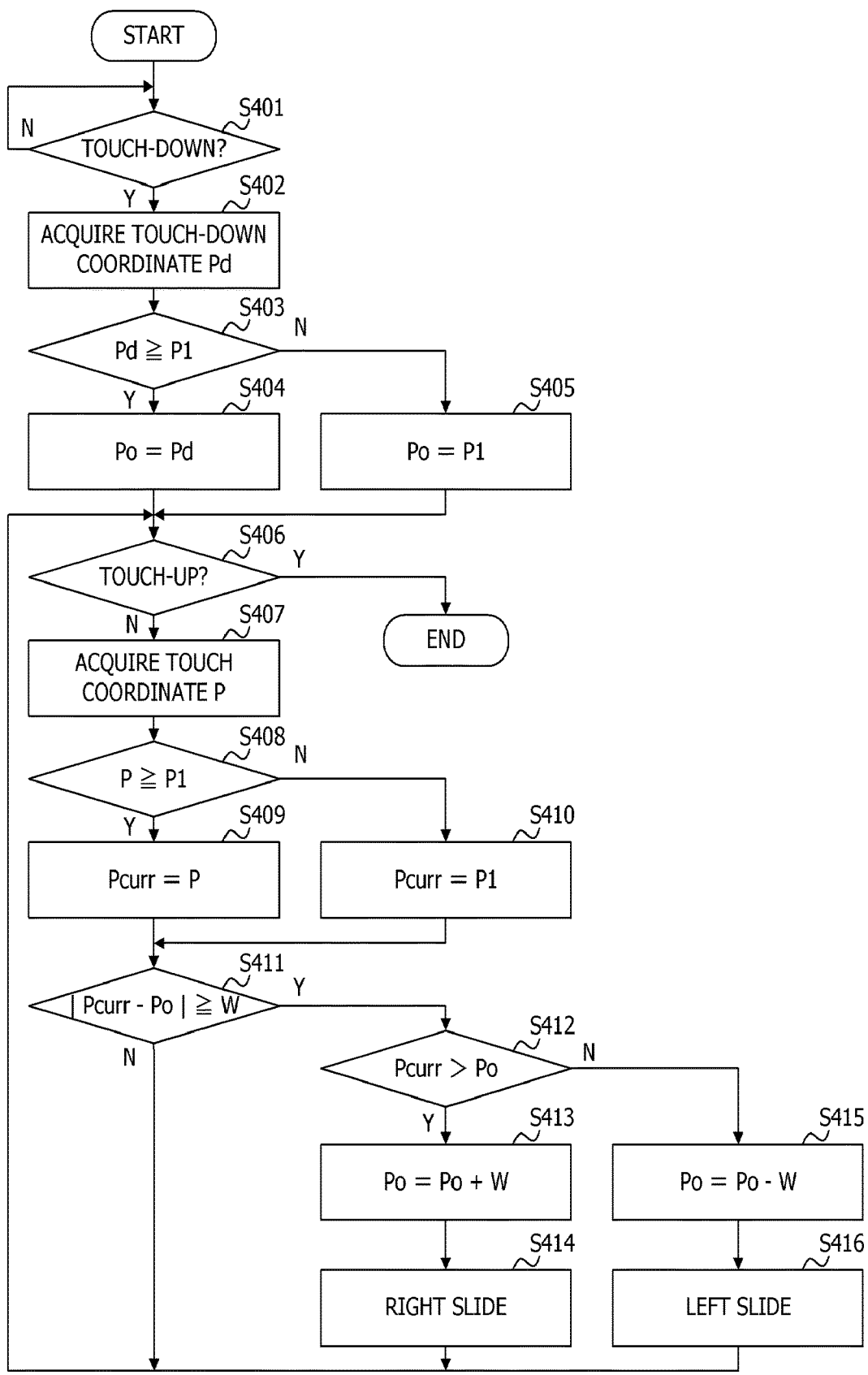
FIG. 4 is a flowchart illustrating an example of processes according to the first embodiment.

FIG. 4 is a flowchart illustrating the process of the digital camera 100 according to the present embodiment. This process is realized by the system control unit 50 loading a program stored in the non-volatile memory 56 into the system memory 52 and executing the program. At the start of this process, it is assumed that the touch bar 82 is in a touch-off state in which nothing is touching the touch bar 82.

In step S401, the system control unit 50 determines whether a touch-down is present on the touch bar 82. The flow proceeds to step S402 when a touch-down is detected, and otherwise, the determination process of step S401 is repeated.

In step S402, the system control unit 50 acquires the coordinate Pd of the touch-down position. In the present embodiment, the system control unit 50 acquires the coordinate of the touch position with respect to the touch bar 82 uniquely as 0 to 255 using the left end as the origin.

In step S403, the system control unit 50 determines whether the coordinate value of Pd is equal to or larger than the coordinate value of P1. Here, as described above, P1 is the coordinate of the left end of the first region and indicates the boundary between the first and second regions. The flow proceeds to step S404 when Pd is equal to or larger than P1, and otherwise, the flow proceeds to S405.

In step S404, the system control unit 50 sets Pd to the coordinate Po of the reference position.

In step S405, the system control unit 50 sets P1 to the coordinate Po of the reference position. In this way, Po serving as the coordinate of the reference position of slide determination is clipped to the lower limit 40 of the first region.

In step S406, the system control unit 50 determines whether a touch-up is present on the touch bar 82. Since a case in which a touch-up is detected is a case in which the movement distance of the touch position has not reached Po±W (that is, touch is released without a slide operation), the function (for example, setting ISO sensitivity to auto) associated with a tap operation is executed and this process ends, and otherwise, the flow proceeds to step S407. Here, the tap operation is effective when the coordinate of a touch-down is within the second region or when the coordinate of a touch-up is within the second region, and the function associated with the tap operation is executed. That is, the second region is a region which is not used for determining the moving distance of a slide and is not regarded as an ineffective region and in which an operation other than a slide such as a tap is accepted.

In step S407, the system control unit 50 acquires the coordinate P (the centroid position of a region in which a touch is detected at the present time point) of a touch position at the present time point at which a finger touches on the touch bar 82. Here, when a touch-down, a touch-move, and a touch-up are detected in the second region, since the movement distance of the touch position has not reached Po±W, the system control unit 50 executes the function associated with the tap operation. When a touch operation that finishes in the second region is present, the system control unit 50 may regard the touch operation as being ineffective without executing the function associated with a tap.

In step S408, the system control unit 50 determines whether the coordinate value of the coordinate P of a touch position is equal to or larger than the coordinate value of P1. The flow proceeds to step S409 when the coordinate value of P is equal to or larger than the coordinate value of P1, and otherwise, the flow proceeds to step S410.

In step S409, the system control unit 50 sets P to Pcurr. Here, Pcurr is the coordinate indicating the present position for convenience.

In step S410, the system control unit 50 sets P1 to Pcurr. That is, the present touch position is clipped to P1 if the detected touch position is within the second region.

As described above, the second region represented by the coordinates 0 to 39 is a region in which a touch coordinate is not obtained stably. Due to this, when the coordinate value of the coordinate P of an actual touch position (a detected touch position) is smaller than the coordinate value of P1, |P-Po| which is a displacement (that is, an actual slide amount) of the coordinate of the touch position is not stable. Here, in the present embodiment, the system control unit 50 clips the coordinate Pcurr of the touch position to the lower limit 40 of a region in which a touch coordinate is obtained stably. That is, the system control unit 50 clips the two coordinates Po and Pcurr related to calculation of the slide amount (movement distance) to a range of 40 to 255. In this way, in step S411 and the subsequent steps, when the slide amount (|Pcurr-Po|) within the range of 40 to 255 is equal to or larger than a predetermined interval W (S411: Y), the slide function is executed.

A slide amount calculated by the system control unit 50 in the present embodiment is a displacement amount between the coordinate Po of the reference position after the previous loop processing (or immediately after a touch-down) and Pcurr which is the present position for convenience in the loop processing (S406 and subsequent steps) as described above.

In step S411, the system control unit 50 determines whether an absolute value (|Pcurr-Po|) of a difference between Pcurr which is the present position for convenience and the coordinate Po of the reference position is equal to or larger than W. When the absolute value is equal to or larger than W, the touch position has been moved to the right or the left by a distance of W or more from the coordinate Po of the reference position. The flow proceeds to step S412 when the absolute value is equal to or larger than W, and otherwise, the flow returns to step S406. Here, as described above, when the coordinate value of the coordinate P of the touch position is smaller than the coordinate value of P1 (S408: N), Pcurr which is the present position for convenience remains at P1 (step S410). That is, when a touch-move starts from the coordinate Po of the reference position and the coordinate P of the touch position after the movement is within the second region, the function associated with the slide operation to be described later is not executed even if |P-Po| which is an actual slide amount reaches W.

In step S412, the system control unit 50 determines whether the coordinate value of Pcurr is larger than the coordinate value of Po. That is, a moving direction of the touch position is determined. The flow proceeds to step S413 when the coordinate value of Pcurr is larger than the coordinate value of Po, and otherwise, the flow proceeds to step S415.

In step S413, the system control unit 50 updates Po+W as the coordinate Po of a new reference position. In step S414, the system control unit 50 executes a function associated with a right slide operation. For example, ISO sensitivity is decreased by ⅓ level from the setting value before change.

In step S415, the system control unit 50 updates Po-W as the coordinate Po of a new reference position. In step S416, the system control unit 50 executes a function associated with a left slide operation. For example, ISO sensitivity is increased by ⅓ level from the setting value before change.

As described above, according to the present embodiment, by limiting a domain used for slide determination of a line touch sensor such as a touch bar to a right-side region that the finger of a user can easily reach, it is possible to improve the operability related to a slide function. More specifically, by limiting a slide determination region to a region in which a difference does not occur between the slide movement distance intended by the user and the movement distance of the acquired coordinate, a discrepancy rarely occurs between the movement distance of the user's finger when a slide operation is performed and an execution frequency of a function based on a slide. Therefore, it is possible to secure an operational feeling (linearity) that a touching finger or pen has to be moved for an approximately always-the-same distance in order to achieve one level of parameter change with a slide operation. In other words, it is possible to provide such an operational feeling (linearity) that a moving distance of a finger or a pen and a parameter change amount are proportional to each other in a slide operation on the touch bar 82. Moreover, by updating the coordinate of the reference position with movement of the touch position, it is possible to change the setting continuously.

Second Embodiment

In the above-described embodiment, an example in which, as a result of a slide operation on the touch bar 82, one level of the function corresponding to a left slide operation or a right slide operation is performed whenever the touch position is moved for the distance of W has been described. However, the touch position may be moved greatly by a distance of 2×W or more in one coordinate acquisition period of the touch bar 82. This occurs when the moving speed of the touch position is fast, when the acquisition period of the touch coordinate is slow, or when W is set to a short distance. In the present embodiment, an example in which the processing corresponding to the movement distance can be performed in such a case will be described.

Figure 5:
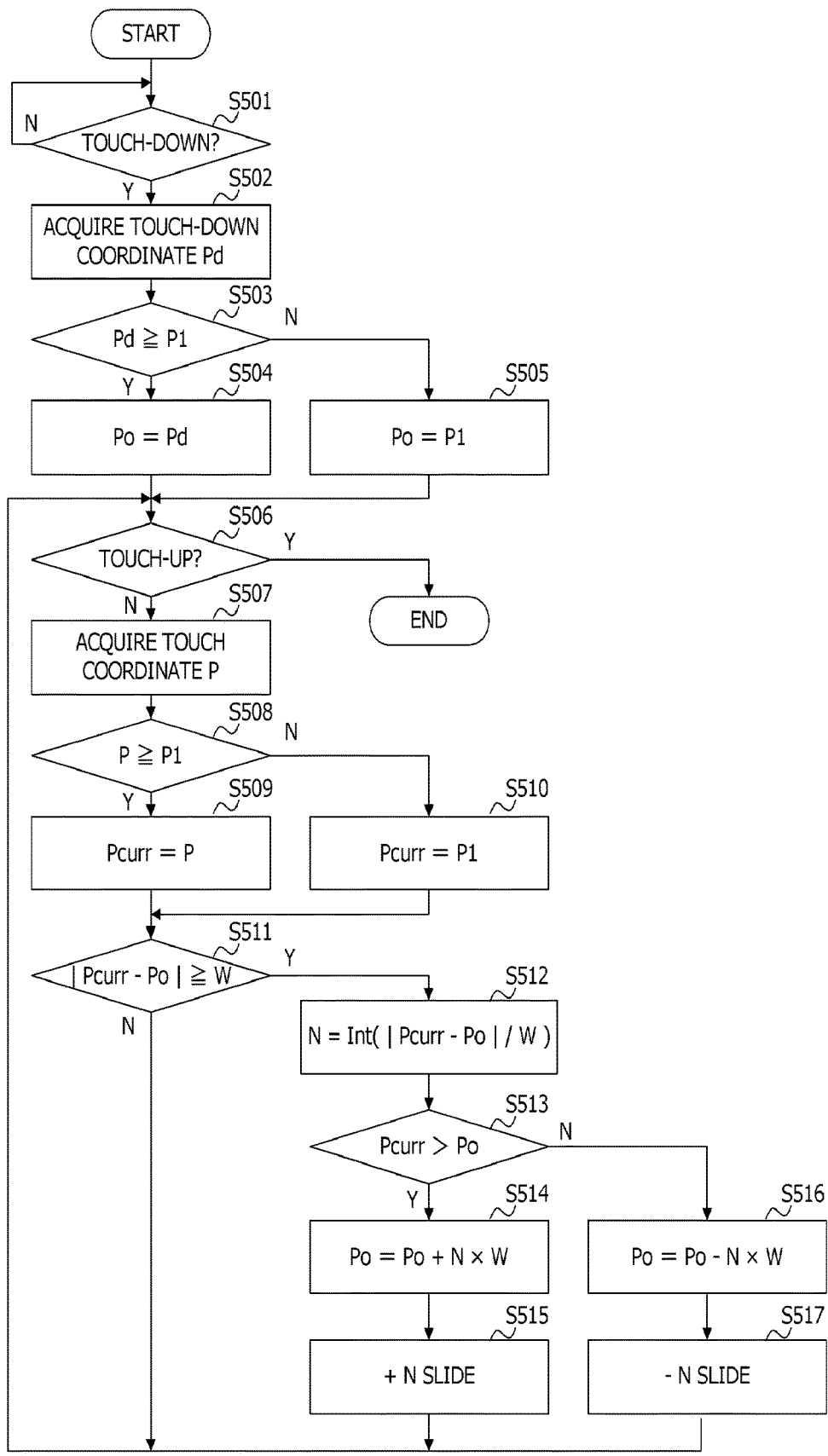
FIG. 5 is a flowchart illustrating an example of processes according to a second embodiment.

FIG. 5 is a flowchart illustrating the process of the digital camera 100 according to the present embodiment. This process is realized by the system control unit 50 loading a program stored in the non-volatile memory 56 into the system memory 52 and executing the program. At the start of this process, it is assumed that the touch bar 82 is in a touch-off state in which nothing is touching the touch bar 82.

The processes of steps S501 to S511 are similar to the processes of steps S401 to S411 of FIG. 4, the description thereof will be omitted.

In step S512, the system control unit 50 calculates a change amount N. The change amount N indicates a change amount of a parameter related to a function associated with a slide operation of the touch bar 82, obtained according to a slide amount of the touch operation. For example, the change amount N can be obtained as Int(|Pcurr−Po|/W). Here, Int( ) is a function that rounds the value in the parentheses down to the nearest integer. This calculates how many multiples of W, Pcurr has moved from Po, and when the absolute value is equal to or larger than W (S511: Y), it indicates that Pcurr has moved to a position separated by N (≥1) multiples of W from Po.

In step S513, the system control unit 50 determines whether the coordinate value of Pcurr is larger than the coordinate value of Po. That is, the moving direction of the touch position is determined. The flow proceeds to step S514 when the coordinate value of Pcurr is larger than the coordinate value of Po, and otherwise, the flow proceeds to step S516.

In step S514, the system control unit 50 updates Po+N×W as the coordinate Po of a new reference position. In step S515, the system control unit 50 changes the parameter related to the function associated with the slide operation to +N. For example, when the function associated with the slide operation is "changing the setting value of ISO sensitivity" and N is 2, the system control unit 50 increases the setting parameter of ISO sensitivity by two steps (⅔ level if one step is ⅓ level).

In step S516, the system control unit 50 updates Po−N×W as the coordinate Po of a new reference position. In step S517, the system control unit 50 changes the parameter related to the function associated with the slide operation to −N.

As described above, according to the present embodiment, it is possible to change the parameter according to the slide amount. That is, it is possible to change the parameter every predetermined distance of movement in one slide operation.

While preferred embodiments of the present invention have been described, the present invention is not limited to these embodiments and various modifications and changes can be made within the spirit of the present invention.

Modification

In the above-described embodiments, although the process illustrated in FIG. 4 or 5 has been described as an example, the processing content is not particularly limited. When the detected touch position is moved from a reference position in the first region to the second region, the function associated with the slide operation may not be executed even if the movement distance from the reference position to the detected touch position after the movement reaches a predetermined distance. For example, when the touch coordinate P is within the second region (S408: N), the flow may return to step S406 without performing the clipping process of step S410. Moreover, when the difference between Po and the touch coordinate P acquired in step S407 is equal to or larger than W, the present position Pcurr for convenience may be calculated.

In the above-described embodiments, although an example of detecting a touch on the X coordinate in the longitudinal direction of the touch sensor has been described as an example, the touch sensor may detect a touch on the Y coordinate orthogonal to the X coordinate. Moreover, in the above-described embodiments, although an example in which a horizontal touch sensor is provided on the right side of a finder member has been described, the touch sensor may be provided on the opposite side. For example, a horizontal touch sensor may be provided on the left side of a finder member or the like. Moreover, the touch sensor may be a vertical touch sensor and may be provided on the upper side or the lower side of a finder member or the like. In this case, the second region may be an end region close to a finder member or the like. Moreover, the touch sensor may be a two-dimensional sensor, and for example, when a finder member or the like is present in the upper left side of the touch sensor, the regions (the end regions in the X and Y axes) of the left and upper ends of the touch sensor may be the second region. Furthermore, an end region in the X or Y axis may be the second region.

In the above-described embodiments, although the control of tap and slide operations of the touch bar mounted on a digital camera has been described, the control can be applied to an operating unit such as a touch panel or a touch pad mounted on various electronic apparatuses.

In the above-described embodiments, although an apparatus in which a touch bar (an operating unit) and a digital camera (an imaging device) are integrated has been described as an example, the control on the digital camera may be performed using a touch bar mounted on an electronic apparatus separated from the digital camera.

The above-described various control operations described as being executed by the system control unit 50 may be performed by one hardware component, and the respective processes may be shared by a plurality of hardware components (for example, a plurality of processors or circuits) whereby the control of the entire apparatus is realized.

While the present invention has been described on the basis of the preferred embodiments, the present invention is not limited to these specific embodiments and various embodiments made without departing from the spirit of the present invention also fall within the scope of the present invention. Furthermore, the above-described respective embodiments illustrate embodiments of the present invention, and the respective embodiments may be combined appropriately.

In the above-described embodiments, although a case in which the present invention is applied to a digital camera has been described as an example, the present invention is not limited to this example, and the present invention can be applied to an electronic apparatus in which a touch sensor can be mounted or connected. That is, the present invention can be applied to, for example, a personal computer, a PDA, a mobile phone terminal, a mobile image viewer, a printer apparatus having a display, a digital photo frame, a music player, a gaming machine, an electronic book reader, and the like.

The present invention can be applied to a control apparatus that communicates with an imaging device (including a network camera) via cable or wireless communication and remotely controls the imaging device without being limited to the imaging device body. Examples of the apparatus that remotely controls the imaging device include a smartphone, a tablet PC, a desktop PC, and the like. By transmitting commands for various operations and settings from the control apparatus to the imaging device on the basis of an operation performed on the control apparatus or a process performed on the control apparatus, it is possible to remotely control the imaging device. Moreover, a live-view image captured by the imaging device may be received via cable or wireless communication and be displayed on the control apparatus.

Other Embodiments

The present invention is realized by executing the following processes. That is, software (a program) that realizes the functions of the above-described embodiments is supplied to a system or apparatus via a network or various storage media, and a computer (CPU, MPU, or the like) of the system or apparatus reads and executes the program codes. In this case, the program and a storage medium storing the program each form the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125352, filed on Jun. 29, 2018, which is hereby incorporated by reference herein in its entirety.

What is claimed is:

1. An electronic apparatus comprising:
a touch detector configured to detect a touch operation on a touch detection surface; and
at least one processor and at least one memory which stores instructions for causing the at least one processor to perform the following operations:
in a case where a direction from a first region of the touch detection surface toward a second region adjacent to the first region is denoted by a second direction and a direction opposite to the second direction is denoted by a first direction,
executing a first function in response to movement of a detected touch position by a predetermined distance in the first direction from a reference position of movement determination of a touch and updating the reference position to a position moved for the predetermined distance in the first direction in a case where the detected touch position has moved in the first direction from the reference position,
executing a second function in response to movement of a detected touch position by the predetermined distance in the second direction from the reference position and updating the reference position to a position moved for the predetermined distance in the second direction in a case where the detected touch position has moved in the second direction from the reference position and the detected touch position after the movement is in the first region, and
not executing the second function and not updating the reference position even if a movement distance from the reference position to a detected touch position after the movement reaches the predetermined distance in a case where the detected touch position has moved in the second direction from the reference position and the detected touch position after the movement is in the second region.

2. The electronic apparatus according to claim 1, wherein the at least one processor is further configured to execute a third function in response to releasing of a touch without movement of the detected touch position in a case where the detected touch position is in the second region.

3. The electronic apparatus according to claim 1, wherein the at least one processor is further configured:
to be capable of executing the first function or the second function every movement by predetermined distance in one slide operation, in a case where further movement of the detected touch position is performed without releasing of a touch after the update of the reference position,
to execute the first function in response to movement by the predetermined distance in the first direction from the reference position after the update in a case where the detected touch position after the further movement is in the first region,
to execute the second function in response to movement by the predetermined distance in the second direction from the reference position after the update in a case where the detected touch position after the further movement is in the first region, and
not to execute the second function even if a movement distance from the reference position after the update to the detected touch position after the further movement reaches the predetermined distance in a case where the detected touch position after the further movement is in the second region.

4. The electronic apparatus according to claim 1,
wherein the touch detector is a capacitance-type touch sensor including a plurality of electrodes, and
wherein the detected touch position is acquired on the basis of an average output of the plurality of electrodes.

5. The electronic apparatus according to claim 1, wherein the at least one processor is further configured:
to use a starting point of a touch operation as an initial reference position in a case of the starting point of the touch operation on the touch detection surface is within the first region, and
to use a position closest to the second region within the first region as the initial reference position in a case where the starting point of the touch operation is within the second region.

6. The electronic apparatus according to claim 1, wherein the at least one processor is further configured not to execute the second function and not to update the reference position even if a movement distance from the reference position to the detected touch position after the movement reaches the predetermined distance in a case where (1) the detected touch position has moved from the reference position in the second direction, (2) the detected touch position after the movement is in the second region, and (3) a distance from the reference position to the second region is within the predetermined distance.

7. The electronic apparatus according to claim 1, wherein the predetermined distance is a first interval which is a length obtained by evenly dividing a width of the first region or an integer multiple of the first interval.

8. The electronic apparatus according to claim 7, wherein the first interval is larger than a width of the second region.

9. The electronic apparatus according to claim 7, wherein the first region is equal to or larger than twice the first interval.

10. The electronic apparatus according to claim 1, wherein the first region is larger than the second region.

11. The electronic apparatus according to claim 1, wherein the first and second functions are functions associated with a slide operation which is an operation of moving a detected touch position while maintaining a touch state after the touch detection surface is touched.

12. The electronic apparatus according to claim 1, wherein the touch detector is a line touch sensor.

13. The electronic apparatus according to claim 1, further comprising:
an imaging sensor; and
a grip portion,
wherein the touch detection surface is provided in a position at which the touch detection surface can be touched by a finger of a hand that grips the grip portion, and
wherein the second region is a region positioned further away in a direction from the grip portion than the first region.

14. The electronic apparatus according to claim 1, further comprising:
an eyepiece for accessing a finder,
wherein the second region is a region positioned closer to the eyepiece than the first region.

15. The electronic apparatus according to claim 1,
wherein the first function is one of a function of increasing a setting value of a specific setting item by one level and a function of decreasing the setting value of the specific setting item by one level, and
wherein the second function is the other one of the function of increasing the setting value of the specific setting item by one level and the function of decreasing the setting value of the specific item by one level.

16. The electronic apparatus according to claim 15, wherein the specific setting item is at least one of ISO sensitivity, a shutter speed, an aperture value, exposure correction, and a volume.

17. An electronic apparatus comprising:
a touch detector configured to detect a touch operation on a touch detection surface; and
at least one processor and at least one memory which stores instructions for causing the at least one processor to perform the following operations:
in a case where a direction from a first region of the touch detection surface toward a second region adjacent to the first region is denoted by a second direction and a direction opposite to the second direction is denoted by a first direction,
executing a first function in response to movement of a detected touch position by a predetermined distance in the first direction from a reference position of movement determination of a touch in a case where the detected touch position has moved in the first direction from the reference position,
executing a second function in response to movement of a detected touch position by the predetermined distance in the second direction from the reference position in a case where the detected touch position has moved in the second direction from the reference position and the detected touch position after the movement is in the first region,
not executing the second function even if a movement distance from the reference position to a detected touch position after the movement reaches the predetermined distance in a case where the detected touch position has moved in the second direction from the reference position and the detected touch position after the movement is in the second region, and
executing a third function in response to releasing of a touch without movement of a detected touch position in a case where the detected touch position is in the second region.

18. A control method of an electronic apparatus including a touch detector configured to detect a touch operation on a touch detection surface, the control method comprising:
in a case where a direction from a first region of the touch detection surface toward a second region adjacent to the first region is denoted by a second direction and a direction opposite to the second direction is denoted by a first direction, executing a first function in response to movement of a detected touch position by a predetermined distance in the first direction from a reference position of movement determination of a touch and to update the reference position to a position moved for the predetermined distance in the first direction in a case where the detected touch position has moved in the first direction from the reference position, executing a second function in response to movement of a detected touch position by the predetermined distance in the second direction from the reference position and to update the reference position to a position moved for the predetermined distance in the second direction in a case where the detected touch position has moved in the second direction from the reference position and the detected touch position after the movement is in the first region, and not executing the second function and not to update the reference position even if a movement distance from the reference position to a detected touch position after the movement reaches the predetermined distance in a case where the detected touch position has moved in the second direction from the reference position and the detected touch position after the movement is in the second region.

19. A control method of an electronic apparatus including a touch detector configured to detect a touch operation on a touch detection surface, the control method comprising:

in a case where a direction from a first region of the touch detection surface toward a second region adjacent to the first region is denoted by a second direction and a direction opposite to the second direction is denoted by a first direction, executing a first function in response to movement of a detected touch position by a predetermined distance in the first direction from a reference position of movement determination of a touch in a case where the detected touch position has moved in the first direction from the reference position, executing a second function in response to movement of a detected touch position by the predetermined distance in the second direction from the reference position in a case where the detected touch position has moved in the second direction from the reference position and the detected touch position after the movement is in the first region, not executing the second function even if a movement distance from the reference position to a detected touch position after the movement reaches the predetermined distance in a case where the detected touch position has moved in the second direction from the reference position and the detected touch position after the movement is in the second region, and executing a third function in response to releasing of a touch without movement of a detected touch position in a case where the detected touch position is in the second region.

20. A non-transitory computer readable medium that stores a program, wherein the program causes a computer to execute: a control method of an electronic apparatus including a touch detector configured to detect a touch operation on a touch detection surface, the control method comprising:

in a case where a direction from a first region of the touch detection surface toward a second region adjacent to the first region is denoted by a second direction and a direction opposite to the second direction is denoted by a first direction, executing a first function in response to movement of a detected touch position by a predetermined distance in the first direction from a reference position of movement determination of a touch and to update the reference position to a position moved for the predetermined distance in the first direction in a case where the detected touch position has moved in the first direction from the reference position, executing a second function in response to movement of a detected touch position by the predetermined distance in the second direction from the reference position and to update the reference position to a position moved for the predetermined distance in the second direction in a case where the detected touch position has moved in the second direction from the reference position and the detected touch position after the movement is in the first region, and not executing the second function and not to update the reference position even if a movement distance from the reference position to a detected touch position after the movement reaches the predetermined distance in a case where the detected touch position has moved in the second direction from the reference position and the detected touch position after the movement is in the second region.

21. A non-transitory computer readable medium that stores a program, wherein the program causes a computer to execute: a control method of an electronic apparatus including a touch detector configured to detect a touch operation on a touch detection surface, the control method comprising:

in a case where a direction from a first region of the touch detection surface toward a second region adjacent to the first region is denoted by a second direction and a direction opposite to the second direction is denoted by a first direction, executing a first function in response to movement of a detected touch position by a predetermined distance in the first direction from a reference position of movement determination of a touch in a case where the detected touch position has moved in the first direction from the reference position, executing a second function in response to movement of a detected touch position by the predetermined distance in the second direction from the reference position in a case where the detected touch position has moved in the second direction from the reference position and the detected touch position after the movement is in the first region, not executing the second function even if a movement distance from the reference position to a detected touch position after the movement reaches the predetermined distance in a case where the detected touch position has moved in the second direction from the reference position and the detected touch position after the movement is in the second region, and executing a third function in response to releasing of a touch without movement of a detected touch position in a case where the detected touch position is in the second region.

* * * * *